United States Patent
Graefen et al.

(10) Patent No.: US 7,808,945 B1
(45) Date of Patent: Oct. 5, 2010

(54) APPARATUS AND METHODS FOR SELECTIVELY COMMUNICATING VOICE COMMUNICATIONS VIA A FEE-BASED NETWORK AND A NONFEE-BASED SPECTRUM

(75) Inventors: Eddy Graefen, Redmond, WA (US); Fulvio Cenciarelli, Suwanee, GA (US); Coulter C. Henry, Marietta, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 321 days.

(21) Appl. No.: 11/252,861

(22) Filed: Oct. 18, 2005

(51) Int. Cl.
*H04W 4/00* (2009.01)
*H04M 1/00* (2006.01)

(52) U.S. Cl. .................... 370/328; 455/552.1

(58) Field of Classification Search .......... 455/406, 455/407, 450, 552.1, 421, 550.1, 553, 448; 370/328, 338
See application file for complete search history.

(56) References Cited

U.S. PATENT DOCUMENTS

| | | | | |
|---|---|---|---|---|
| 6,775,535 | B2 * | 8/2004 | Mittal | 455/406 |
| 6,895,255 | B1 * | 5/2005 | Bridgelall | 455/552.1 |
| 2004/0192264 | A1 * | 9/2004 | Liu et al. | 455/414.1 |
| 2004/0264410 | A1 * | 12/2004 | Sagi et al. | 370/331 |
| 2005/0020286 | A1 | 1/2005 | Lazaridis et al. | |
| 2005/0136897 | A1 * | 6/2005 | Praveenkumar et al. | 455/414.1 |
| 2005/0186951 | A1 * | 8/2005 | Bumiller | 455/418 |
| 2005/0202825 | A1 * | 9/2005 | Puranik et al. | 455/450 |
| 2007/0032230 | A1 * | 2/2007 | Pregont | 455/421 |

* cited by examiner

*Primary Examiner*—George Eng
*Assistant Examiner*—Michael Faragalla

(57) ABSTRACT

An apparatus and method for communicating voice communications to the communications devices of respective recipients thereof using multiple call modes, including, but not limited to, a fee-based network call mode and non-fee based mode. Generally, the fee-based call mode utilizes a wireless communications network to communicate voice communications over relatively large distances and the non-fee based call mode utilizes a proximity communication transport mechanism to communicate voice communications over relatively small distances. The non-network communication transport mechanism includes, for example, the unlicensed free radio spectrum. The apparatus is operable in either of the call modes or in an auto-select call mode in which the apparatus initially attempts to communicate voice communications via a proximity communication transport mechanism and if unsuccessful, subsequently communicates voice communications via a wireless communications network. The apparatus is configurable to operate in any of the call modes.

17 Claims, 4 Drawing Sheets

APPARATUS AND METHODS FOR SELECTIVELY COMMUNICATING VOICE COMMUNICATIONS VIA A FEE-BASED NETWORK AND A NONFEE-BASED SPECTRUM

BACKGROUND OF THE INVENTION

1. Field of the Invention

The present invention relates generally to the field of wireless communications devices and more particularly to wireless communications devices and methods for selectively communicating voice calls over a fee-based wireless communications network and a non-fee based radio spectrum.

2. Description of the Related Art

For many years, people have communicated with one another by using wireless devices such as cellular telephones. Conventional cellular communication systems include a plurality (typically thousands or millions) of handheld, wireless devices, such as cellular telephones, which communicate through one or more cell towers and base stations to connect to a recipient. Users of the cellular communications systems pay the cellular network provider for using airtime. Such charges generally apply regardless of whether the user is contacting someone one mile away, ten miles away, or a thousand miles away. However, when the senders and recipients of voice communications are not separated by a substantial distance and are, instead, in relative close proximity, the use of communication networks for communicating between such senders and receivers consumes valuable and expensive communication network resources that might otherwise be used for communicating between senders and recipients who are separated by substantial distances.

Therefore, there is a need in the industry for apparatuses and methods for communicating voice communications that allows a sender of the voice communication to choose to communicate over a fee-based network or to communicate over a non-fee based spectrum if respective senders and receivers are in relative close proximity, and that address these and other problems, deficiencies, and shortcomings of the industry.

SUMMARY OF THE PRESENT INVENTION

Broadly described, the present invention includes an apparatus and method for communicating voice communications using a wireless handheld apparatus to communicate a voice communication between a sender and a recipient and for use in conjunction with a fee-based wireless network. The apparatus includes one or more radios being operable for communicating a voice communication to the recipient via the fee-based wireless network and via a non-fee based spectrum, such as the unlicensed free radio spectrum. The apparatus can be configured and adapted to send the voice communication via the non-fee based spectrum at times and at other times to send the voice communication via the fee-based wireless network.

More particularly, the present invention comprises an apparatus and method for communicating voice communications to wireless handheld communications devices of voice communication recipients using a fee-based wireless network and a non-fee based spectrum. Generally, the fee-based wireless network utilizes a wireless communications network to communicate voice communications over relatively large distances and the non-fee based spectrum utilizes a proximity communication transport mechanism to communicate voice communications over relatively small distances. The apparatus is operable, according to the methods described herein, in either the fee-based network or in the non-fee based spectrum. The apparatus is further operable to attempt the establishment of voice communications with the recipient using the non-fee based spectrum, and if the attempt is successful, the apparatus automatically communicates the voice communication to the recipient. Moreover, the wireless handheld apparatus is further operable to automatically communicate the voice communication to the recipient using the fee-based wireless network if the attempt is unsuccessful. Further, the apparatus is configurable by a user thereof to operate in either the fee-based network or in the non-fee based spectrum, or the apparatus can be configured such that the apparatus automatically selects whether to operate in the fee-based network or in the non-fee based spectrum. Optionally, the wireless handheld apparatus is further operable to communicate a voice communication to a plurality of recipients simultaneously via the non-fee based spectrum.

In another aspect, the present invention includes a method of communicating a voice communication from a first wireless device to a second wireless device. The method has the steps of transmitting, or attempting to transmit, a voice communication from the first wireless device to the second wireless device using a non-fee based wireless spectrum and if the voice communication is not received by the second wireless device, then transmitting the voice communication from the first wireless device to the second wireless device using a fee-based communications network.

Advantageously, by enabling the communication of voice communications via multiple call modes including a fee-based network and a non-fee based spectrum, the apparatus of the present invention optimizes the communication of voice communications to best utilize the valuable resources of a wireless communications network for communicating voice communications between senders and respective receivers thereof that are located distant from one another. The apparatus of the present invention also allows a sender of voice communications to avoid charges or the consumption of valuable air time minutes for the communication of such voice communications when the receivers thereof are located proximate to the sender. Additionally, because the apparatus of the present invention can be configurable to automatically and seamlessly attempt to communicate voice communications initially via a non-fee based spectrum and if unsuccessful, then via a fee-based network, such benefits inure to a communication carrier and to a user thereof in a substantially transparent manner.

Other advantages and benefits of the present invention will become apparent upon reading and understanding the present specification when taken in conjunction with the appended drawings.

DETAILED DESCRIPTION OF THE INVENTION

Figure 1:
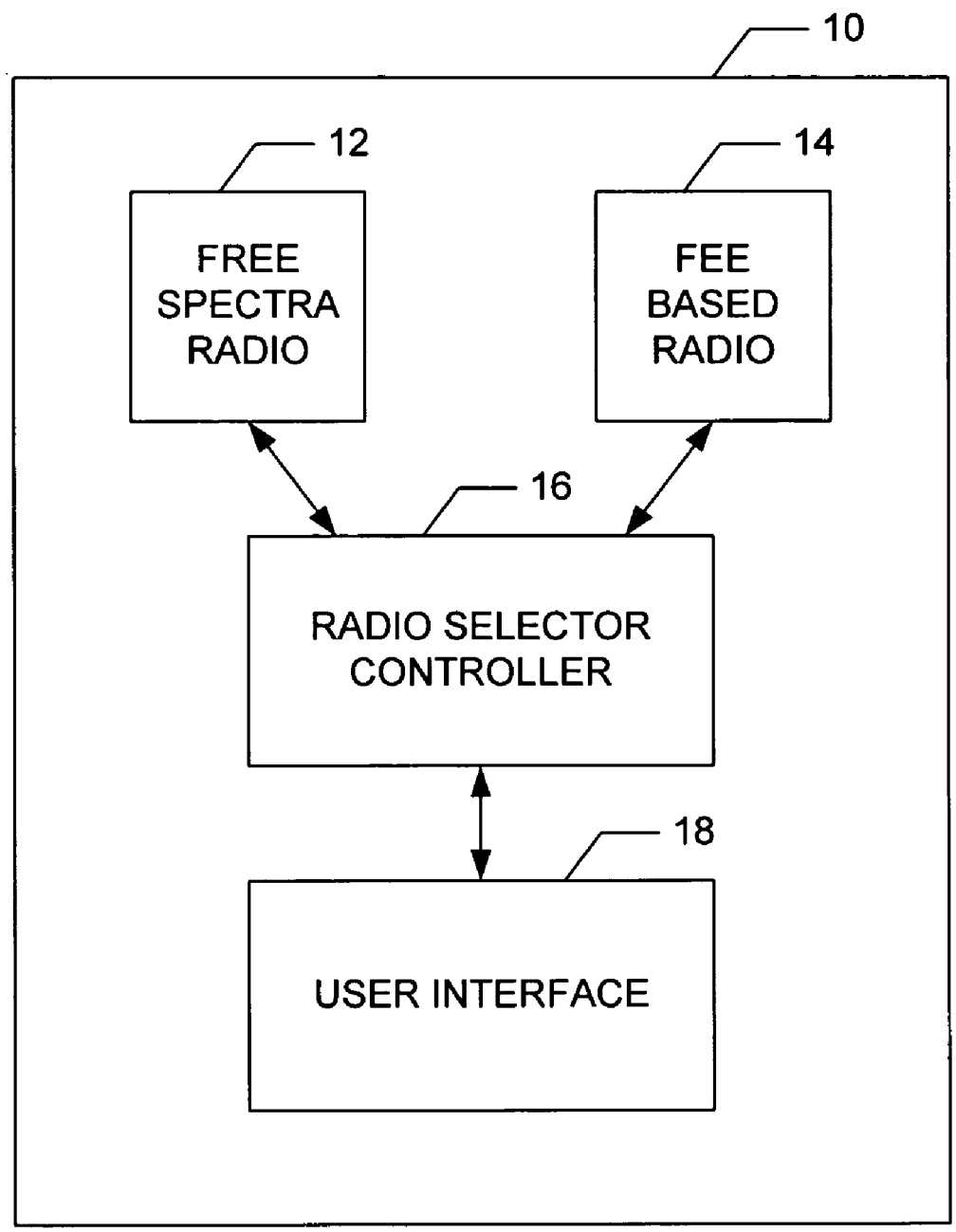
FIG. 1 is a block diagram representation of a wireless communications device in accordance with an exemplary embodiment of the present invention.

Referring now to the drawings in which like numerals represent like elements or steps throughout the several views, FIG. 1 displays a block-diagram representation of a wireless handheld, communications device 10 for sending and receiving voice communications using multiple communication spectra and for performing related functions in accordance with an exemplary embodiment of the present invention. The wireless handheld device 10 is operable, as described in more detail below, to communicate voice communications with another communications device via a plurality of communication spectra that include, but are not limited to, a fee-based wireless network and a non-network, non-fee based spectrum. The wireless handheld device 10 is configurable by a user thereof, through received user input, to use only a designated call mode (e.g., a fee-based network only or a non-network only) for the communication of a voice communication or to automatically select a call mode (e.g., network or non-network) for the communication of a voice communication. Generally, the wireless handheld device 10 includes a cellular telephone, although the wireless handheld device can include a wireless personal digital assistant, pager, wireless computer, or other device that is capable of communicating voice communications with other communications devices.

According to the exemplary embodiment described herein, the wireless handheld device 10 comprises a free spectra radio 12 for use with a non-fee based spectrum, such as the free radio spectrum ("FRS"), and a fee-based radio 14 for use with a fee-based, wireless communications network. The free spectra radio 12 can communicate voice communications over a non-network communication transport mechanism and one or more wireless communication channel(s) used thereby. Typically, the non-network communication transport mechanism uses no infrastructure of a communications network and comprises a method for communicating data between two communications devices that are located relatively near one another. Due at least in part to the proximate locations of the two communications devices, such non-network communication transport mechanisms are often referred to as "proximity communication transport mechanisms". According to one exemplary embodiment of the present invention, the non-network communication transport mechanism includes other wireless communication transport mechanisms between proximally located sender and receiver wireless communications devices 10 that use one or more frequency(ies) of the unlicensed free radio spectrum ("FRS") (e.g., a frequency(ies) not licensed to or used by a communication carrier) and, perhaps, ultra high frequency proximity communication transport mechanisms. However, in other exemplary embodiments of the present invention and without limitation, the non-network communication transport mechanism includes the "BLUETOOTH" proximity communication transport mechanism. Generally, such non-network communication transport mechanisms have limited range and, therefore, the distance between the sender and receiver wireless communications devices must often be small in comparison to the distances permitted between the sender and receiver wireless communications devices when a wireless communications network is used to communicate a voice communication therebetween. For example, communications over FRS have a range of about 2 to 12 miles.

The fee-based radio 14 is used to communicate voice communications over a fee-based, wireless network provided by a network carrier. The wireless communications network comprises wired and/or wireless infrastructure (including, but not limited to, receivers, transmitters, and/or transceivers) appropriate to communicate a voice communication between a sender wireless handheld device and a receiver wireless handheld device. Those skilled in the art will understand how to configure the hardware for the free spectra radio 12 and for the fee-based radio 14. In alternate embodiments, the wireless handheld device 10 can include a single radio operable for communicating a voice communication to the recipient via both the fee-based network and the non-fee based spectrum.

A radio selector controller 16 includes a processor and/or other appropriate hardware and software for determining and selecting the appropriate radio (i.e., the free spectra radio 12 or the fee-based radio 14) to use based on a preference entered by the user into a user interface 18. For example, if the radio includes a push to talk button (a "PTT button"), and the user presses the PTT button, then the radio selector controller 16 would select the free radio 12, but if a "send" button were depressed, then the controller would select the fee-based radio 14. Software can also be embedded in the device 10 and configured to allow the radio selector controller 16 to determine and select the appropriate radio. Those skilled in the art will understand that the wireless handheld device 10 can be configured in a number of ways using a combination of standard hardware and software components.

The user interface 18 can include a display, button, and a keypad with a plurality of keys, all of which are generally well known to those skilled in the art. Moreover, those skilled in the art will understand how to configure a user interface suitable for the device 10. In an exemplary form, the wireless handheld device 10 can include several hardware components such as for example, a bus, a processor, a transceiver interface, a transceiver, an antenna, volatile memory capable of storing data without losing any such data as long as electrical power is applied thereto, and non-volatile memory capable of storing data without losing any such data regardless of whether electrical power is applied thereto, all of which are generally well known to those skilled in the art. Also, the non-volatile memory can be adapted to store configuration data identifying the then current call mode in which the wireless handheld device 10 is configured to operate (i.e., call mode configuration data), and to store recipient data associated with potential recipients, or receivers, for voice communications. Such recipient data includes, for example and not limitation, a recipient name, cellular telephone number, non-cellular telephone number, and non-network communication transport mechanism data for each potential voice communication recipient. Such recipient data can be stored in a contact directory in the wireless handheld device 10. Such non-network communication transport mechanism data corresponding to each potential voice communication recipient (and, more particularly, with each recipient's wireless handheld device 10) includes data that is utilized by a non-network communication transport mechanism to communicate a voice communication to the recipient's wireless handheld device 10. The non-network communication transport mechanism data may include data for each different non-network communication transport mechanism that may be employed by the wireless handheld device 10 to communicate voice communications. For example, if the wireless handheld device 10 uses the BLUETOOTH non-network communication transport mechanism to communicate voice communications 20, the non-network communication transport mechanism data for each recipient includes the BLUETOOTH signature identifier of the recipient's wireless handheld device.

Figure 2A:
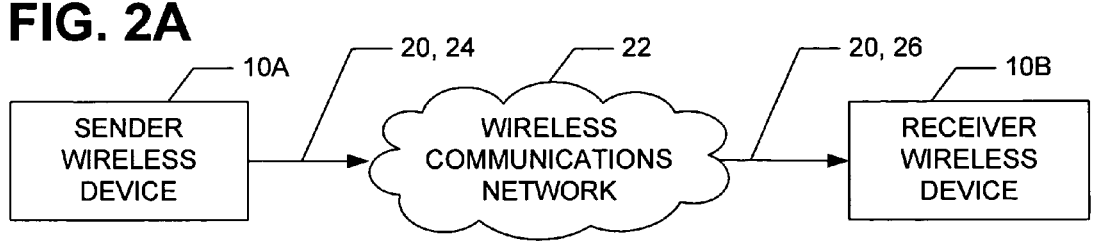
FIGS. 2A-2C are block diagram representations of different call modes in which the wireless communications device of FIG. 1 is operable in accordance with an exemplary embodiment of the present invention.
Figure 2B:
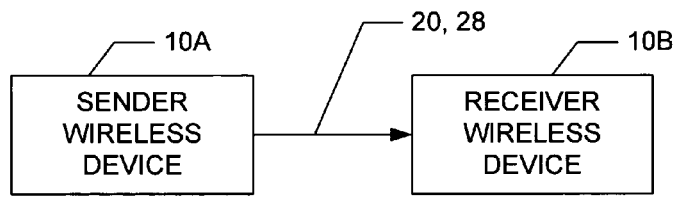
Figure 2C:
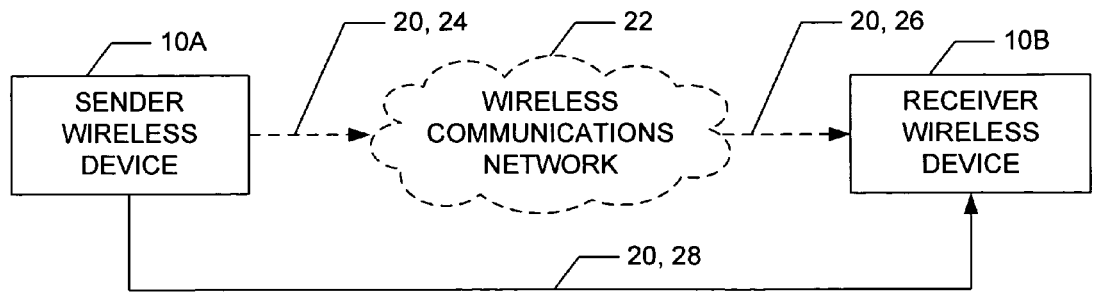

The wireless handheld device 10 is operable and configurable by a user thereof to communicate voice communications with another communications device via a plurality of call modes. FIGS. 2A-2C display pictorial block diagram representations of the different call modes in which the wireless handheld device 10 is operable in accordance with the exemplary embodiment of the present invention. In FIGS. 2A-2C, the sender wireless handheld device 10A comprises a wireless handheld, communications device used by a sender of a voice communication 20, and the receiver wireless handheld device 10B comprises a wireless handheld device 10 used by a desired receiver of the voice communication 20.

According to a first call mode illustrated by FIG. 2A, the sender wireless handheld device 10A attempts to communicate a voice communication to the receiver wireless handheld device 10B only through a wireless communications network 22 of a communication carrier. The sender may choose to communicate over the fee-based network if the user knows, or has reason to know, that the receiver is outside the range of non-fee based spectrum. Or, the user may not want to communicate over the non-fee based spectrum, which may not be as secure for private conversations.

Thus, in accordance with the first call mode, the sender wireless handheld device 10A wirelessly transmits the voice communication 20 to a receiver of the wireless communications network 22 using a wireless communication channel 24 and an appropriate network frequency assigned to the communication carrier and utilized by the wireless communications network 22 for the communication of a voice communication 20. After receiving the voice communication 20, the wireless communications network 22 uses its infrastructure to subsequently communicate, or forward, the voice communication 20 internally to one or more transmitter(s) thereof that then broadcast the voice communication 20 on a wireless communication channel 26 to the receiver wireless handheld device 10B on an appropriate network frequency. Such appropriate network frequency(ies), typically, correspond to those licensed to the communication carrier and that are used by the wireless communications network 22.

Generally, a user of the sender wireless handheld device 10A configures the sender wireless handheld device to utilize the first call mode for sending a voice communication 20 when the user knows, or has reason to believe, that the receiver wireless handheld device 10B for a voice communication 20 is located at a substantial distance relative to the sender wireless handheld device. If the user is correct and the receiver wireless handheld device 10B is distant from the sender wireless handheld device 10A, then use of the first call mode by the sender wireless handheld device 10A may be the only method by which a voice communication 20 may be communicated to the receiver wireless handheld device 10B. However, if the receiver wireless handheld device 10B is not distant from and is, instead, proximate to the sender wireless handheld device 10A, use of the first call mode can unnecessarily tie up valuable wireless communications network 22 resources in order to communicate the voice communication 20 to the receiver wireless handheld device 10B.

In accordance with the second call mode illustrated by FIG. 2B, a sender wireless handheld device 10A communicates a voice communication 20 to a receiver wireless handheld device 10B only via a non-network communication transport mechanism and one or more wireless communication channel(s) 28 used thereby. However, use of a non-fee based communication spectrum may not be as secure as a fee-based communications network. For example, conversations transmitted over conventional two-way radios are not very secure, as other non-intended receivers can overhear the conversations if tuned to the correct channel or frequency. But, the sender and receiver wireless devices 10 of the present can be configured to transmit on particular channels or sidebands so as to minimize the chance of a non-intended receiver of overhearing the conversation. Or, groups of wireless devices 10 can include an identical security key such that the sender wireless device 10A encrypts the voice communication 20 and sends it to the receiver wireless device 10B where it decrypts the message. Thus, only those wireless devices 10 with the correct security key can understand the voice communication.

In contrast to the first call mode, the user of a sender wireless handheld device 10A configures the sender wireless handheld device 10A to utilize the second call mode for communicating a voice communication 20 to the receiver wireless handheld device 10B when the user knows, or has reason to believe, that the receiver wireless handheld device 10B is located relatively near the sender wireless handheld device 10A. For example and not limitation, if the user of the sender wireless handheld device 10A knows that the receiver wireless handheld device 10B for a voice communication 20 is on the same floor of a building, in the same building, or perhaps within a few miles, then the user could configure the sender wireless handheld device 10A to utilize the second call mode. It should be noted that the applicability of use of the second call mode by the sender wireless handheld device 10A depends on the particular non-network communication transport mechanism employed thereby for the communication of a voice communication 20 to a proximally located receiver wireless handheld device 10B. For example, if the BLUETOOTH proximity communication transport mechanism is employed by the sender wireless handheld device 10A, the receiver wireless handheld device 10B must be within approximately 30 feet of the sender wireless handheld device 10A in order to receive a voice communication 20 communicated by the sender wireless handheld device 10A. In further example, if another wireless proximity communication transport mechanism is employed by the sender wireless handheld device 10A, the receiver wireless handheld device 10B may be located, perhaps, up to five miles or more from the sender wireless handheld device 10A and receive a voice communication 20 therefrom. From the foregoing, it should be understood that the permissible distance for successful communications between the sender and receiver wireless communications devices 10A, 10B for a particular non-network communication transport mechanism depends on the particular technology employed by such non-network communication transport mechanism and may be different for each different non-network communication transport mechanism.

In an exemplary embodiment, the sender wireless device 10A communicates directly with the receiver wireless device 10B. In another embodiment, the sender wireless device 10A can communicate indirectly with the receiver wireless device 10B. For example, the sender wireless device 10A can communicate the voice communication 20 through an intermediary device, such as for example a computer or other device, which then communicates the voice communication 20 to the receiver wireless device 10B.

If the user of a sender wireless handheld device 10A correctly ascertains that the sender and receiver wireless communications devices 10A, 10B are not overly distant for use of the second call mode, unnecessary use of the valuable resources of the wireless communications network 22 of a communication carrier is avoided by the user configuring the sender wireless handheld device 10A to communicate a voice communication 20 only via the non-network communication transport mechanism associated with the second call mode. However, if the user is incorrect with respect to the distance between the sender and receiver wireless communications devices 10A, 10B and erroneously configures the sender wireless handheld device 10A to communicate the voice communication 20 only via the second call mode, the receiver wireless handheld device 10A will be unable to receive the voice communication 20.

According to a third call mode illustrated in FIG. 2C and sometimes referred to herein as "auto-select mode" or "auto-select call mode", the sender wireless handheld device 10A attempts to communicate a voice communication 20 to the receiver wireless handheld device 10B using a two stage process or method. Initially, during the first stage, the sender wireless handheld device 10A attempts to communicate the voice communication 20 to the receiver wireless handheld device 10B using a non-network communication transport mechanism of the second call mode as described with reference to FIG. 2B above. For example, the sender wireless communications device 10A may "ping" or send a bit or packet of data to determine if the receiver wireless communications device 10B is accessible. If the receiver wireless communications device 10B is accessible, then the sender wireless communications device 10A communicates the voice communication over the non-fee based spectrum. If the receiver wireless communications device 10B is not accessible, then the sender wireless communications device 10A either communicates the voice communication over the fee-based network or notifies the sender that the communication cannot be transmitted. If the device 10A notifies the sender that the communication cannot be transmitted, then the device 10A may give the sender the option to access and transmit the communication over the fee-based network.

If the sender wireless handheld device 10A is unable to successfully communicate the voice communication 20 to the receiver wireless handheld device 10B using a non-network communication transport mechanism within a reasonable period of time, the sender wireless handheld device 10A then automatically opts, or selects, to attempt communication of the voice communication 20 to the receiver wireless handheld device 10B in accordance with a second, alternative stage of the two stage process. During the second stage, the sender wireless communications device attempts to communicate the voice communication 20 through a wireless communications network 22 of a communication carrier as described above with respect to FIG. 2A and as indicated by the dashed voice communication 20, wireless communications network 22, and communication channels 24, 26 in FIG. 2C.

By virtue of the sender wireless handheld device 10A being operable when configured in the third configuration mode to automatically self-select between the use of a non-network communication transport mechanism and a wireless communications network 22 for communicating a voice communication 20 to a receiver wireless handheld device 10B and in contrast to the use of the first and second call modes described above, it is unnecessary for the user of the sender wireless handheld device 10A to attempt to determine the relative distance between the sender and receiver wireless communications devices 10A, 10B when configuring the sender wireless handheld device 10A for operation. Further, operation of the sender wireless handheld device 10A in accordance with the third call mode substantially prevents a voice communication 20 from not being received by a receiver wireless handheld device 10B due to the presence of too much distance between the sender and receiver wireless communications devices 10A, 10B and avoids the unnecessary use of wireless communications network resources to communicate a voice communication 20 between proximate sender and receiver wireless communications devices 10A, 10B.

The user can configure the wireless handheld device 10A to one particular call mode such that all voice communications use that particular call mode until the user selects another call mode. Alternatively, the user can select a preferred call mode for each contact stored in a contact directory on the wireless handheld device. Thus, the user may choose to call Contact A via only the fee-based, wireless communications network, call Contact B using only the non-fee based spectrum, and call Contact C using an automatic selection between the non-fee based spectrum and the fee-based, wireless communications network. Also, an icon can appear on the display of the wireless device, such as by each the name of each contact stored in the contact directory, to indicate the mode of communication. Moreover, when automatic selection mode is active, one icon can be displayed to alert the sender that he or she is communicating over the fee-based network, and a different icon can be used to alert the sender that he or she is communicating over the non-fee based spectrum.

When communicating over the non-fee based spectrum, the sender wireless communications device 10A may broadcast a voice communication to a plurality of recipients. For example, the user may predefine groups of contacts. Such groups can include, for example, a family group, a friends group, or a business workgroup. Thus, the sender wireless communications device 10A can broadcast a voice communication to all members of the group simultaneously in a manner like conventional two-way radios.

Figure 3:
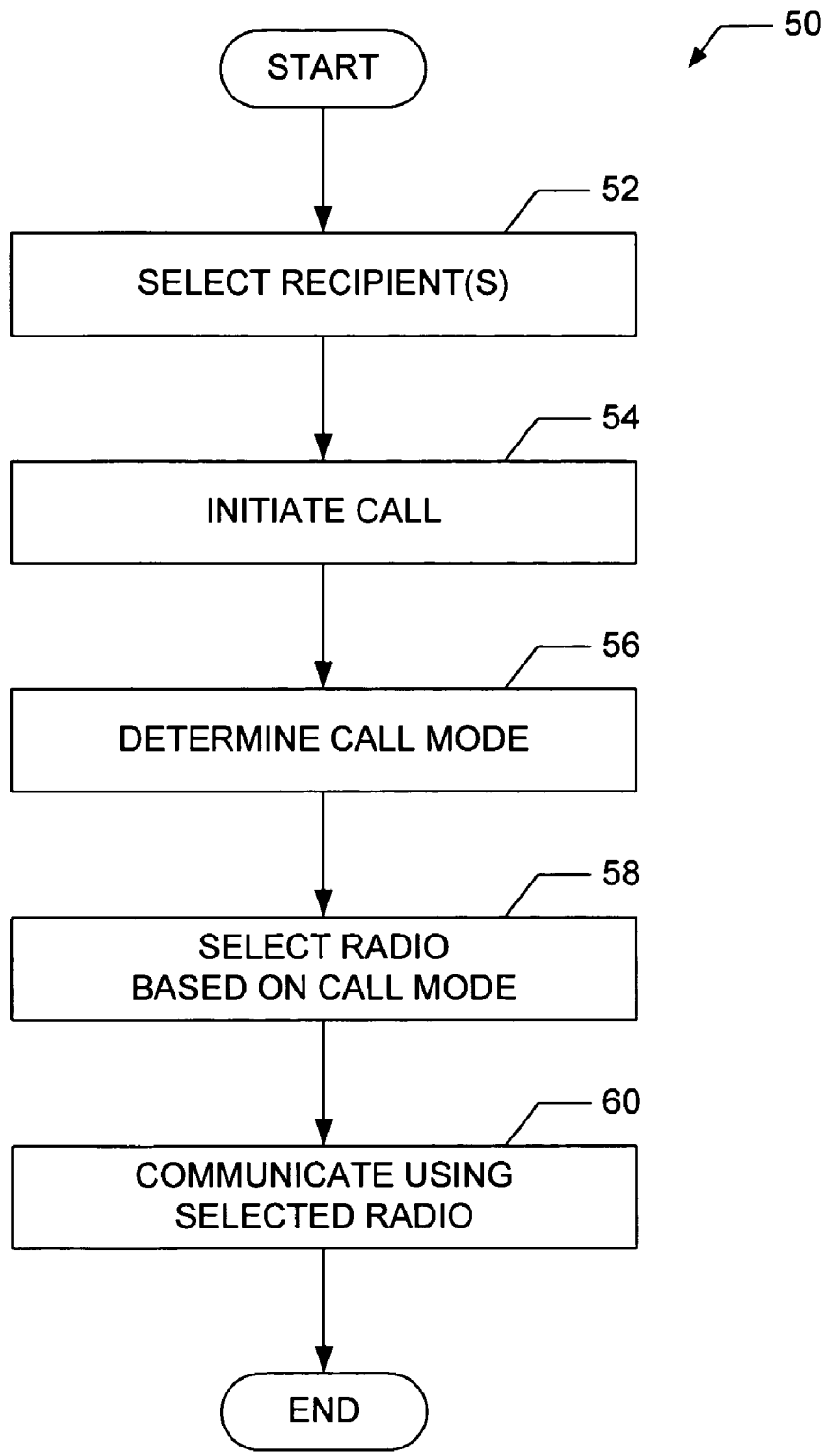
FIG. 3 is a flowchart representation of a method for communicating a voice communication used by the wireless communication device of FIG. 1 in accordance with an exemplary embodiment of the present invention

FIG. 3 displays a flowchart representation of a method 50 for communicating a voice communication 20 used by the wireless handheld device 10 in accordance with the exemplary embodiment of the present invention. Operation of the wireless handheld device 10 according to the method 50 starts at step 52 where the wireless handheld device selects the recipient based on the user's input, and advances to step 54 where the device initiates the call based on the user's input. At step 56, the wireless handheld device 10 determines the call mode based on the user preference inputted into the device. At step 58, the wireless handheld device 10 selects the radio to be used based on the selection of the call mode. At step 60, the wireless handheld device 10 communicates with the recipient by using the selected radio.

Figure 4:
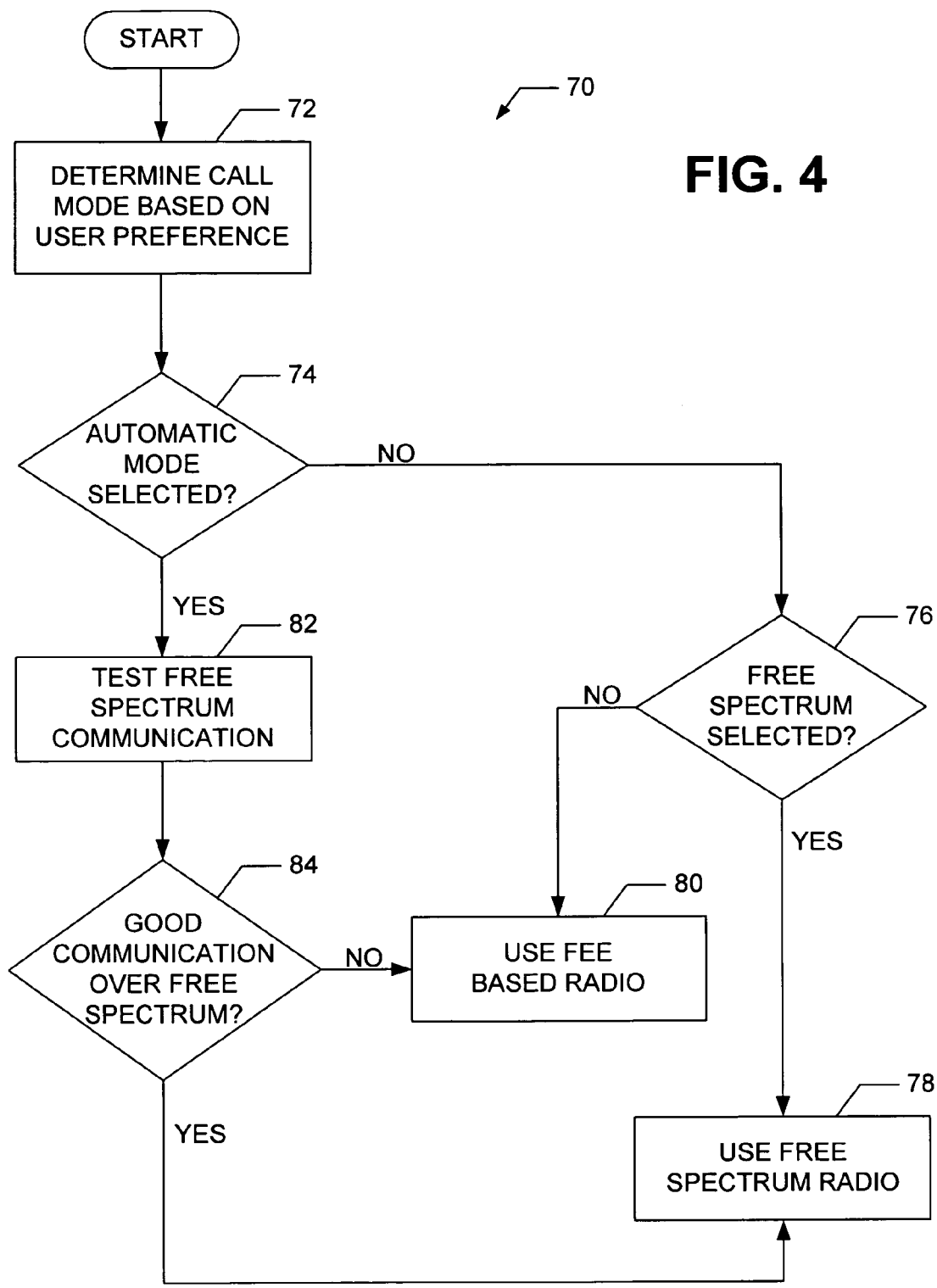
FIG. 4 is a flowchart representation of a method for determining the call mode of the wireless device of FIG. 1 in accordance with an exemplary embodiment of the present invention.

FIG. 4 displays a flowchart representation of a method 70 for determining the selected call mode in accordance with the exemplary embodiment of the present invention. The method 70 comprises a plurality of steps that are performed generally in response to the processor executing a corresponding plurality of software program instructions stored in non-volatile memory when the method 70 is selected from the display by a user using the keys of the keypad to appropriately position the cursor and select, for example, the "send voice communication." Operation of the wireless handheld device 10 according to the method 70 starts at step 72 where the processor of the device determines which call mode of the three call modes (i.e., fee-based network mode, free spectra, or automatic selection by the processor) based on the user selection.

At step 74, the wireless handheld device 10 determines whether the automatic call mode has been selected. If automatic call mode has not been selected, then the device determines if the non-fee based, or free, spectrum has been selected at step 76. If the free spectrum is selected, the device 10 selects and uses the free spectra radio at step 78 to communicate the voice communication. If, however, the device 10 determines that the free spectrum has not been selected, then the device 10 at step 80 uses the fee-based radio to communicate the voice communication over a fee-based communications network.

If, back at step 74, automatic call mode has been selected, then at step 82 the device 10 sends a test, such as a ping, over the free spectrum communication. If the device 10 determines at step 84 that good communication exists over the free spectrum, then the device uses the free spectrum radio to communicate the voice communication. If, however, the device 10 determines at step 84 that there is not good communication over free spectrum, then the device selects and uses the fee-based radio to communicate a voice communication over a fee-based, wireless communications network.

Although not shown in FIG. 4, if the user inputs his or her preference to use only the free spectrum radio, the device 10 can send a test message to determine if there is good communication over the free spectrum before communicating the voice communication. If there is not a good communication, the device 10 can then automatically select the fee-based radio to communicate the voice communication over the fee-based wireless communications network. Additionally, the device 10 can alert the user that it will be transmitting over the fee-based wireless communications network and prompt the user to input whether or not he or she chooses to proceed over the fee-based wireless communications network. Thus, the user can choose to end the call, or the user can choose to communicate the call over the fee-based wireless communications network.

Whereas this invention has been described in detail with particular reference to exemplary embodiments and variations thereof, it is understood that other variations and modifications can be effected within the scope and spirit of the invention, as described herein before and as defined in the appended claims.

What is claimed is:

1. A wireless handheld apparatus for communicating a voice communication between a sender device and a recipient device and for use in conjunction with a fee-based wireless network, said apparatus comprising:
   one or more radios that transmit the voice communication to the recipient device via the fee-based wireless network and via a non-network non fee-based spectrum without use of infrastructure of a communications network, the one or more radios are configured to send the voice communication directly to the recipient device via the non-network non fee-based spectrum without use of infrastructure of a communications network at times and at other times to send the voice communication to the recipient device via the fee-based wireless network, wherein the one or more radios signal an attempt to establish the voice communication with the recipient device using the non-network non fee-based spectrum without use of the infrastructure of the communications network, and automatically transmit the voice communication directly to the recipient device using the non-network non fee-based spectrum without use of the infrastructure of the communications network if the attempt is successful, but automatically communicate the voice communication to the recipient device using the fee-based wireless network if the attempt is unsuccessful; and
   a memory that retains non-network communication transport mechanism data associated with the non-network non fee-based spectrum and that corresponds to a potential recipient device of the voice communication, wherein the non-network communication transport mechanism data includes data for each different non-network transport mechanism employed to communicate the voice communication, the non-network communication transport mechanism uses no infrastructure of the communications network, wherein the one or more radios operate in the non-network non fee-based spectrum to transmit the voice communication directly to the recipient device via a proximity communication transport mechanism comprising an ultra high frequency proximity communication transport mechanism, wherein the one or more radios are configurable to selectively operate in the fee-based wireless network for a first contact stored in a contact directory in the memory, and in the non-network nonfee-based spectrum for a second contact in the contact directory.

2. The apparatus of claim 1, wherein the proximity communication transport mechanism comprises a BLUETOOTH proximity communication transport mechanism.

3. The apparatus of claim 1, wherein the one or more radios operate in the non-network nonfee-based spectrum to transmit the voice communication to the recipient device via unlicensed free radio spectrum.

4. The apparatus of claim 1, wherein the one or more radios are configurable to selectively operate only in the fee-based wireless network or only in the non-network nonfee-based spectrum.

5. The apparatus of claim 1, wherein the one or more radios communicate a voice communication to a plurality of recipient devices simultaneously via the non-network nonfee-based spectrum without use of infrastructure of the communications network.

6. A method of comprising:
   employing a processor executing code instructions stored in a memory, the code instructions when executed by the processor implement the following steps acts:
   (a) attempting to establish a direct non-network nonfee-based radio communication between a first wireless device and a second wireless device, attempting to establish the direct non-network nonfee-based radio communication includes conveying a packet of data from the first wireless device directly without utilizing infrastructure of a communication network to the second wireless device to determine the second wireless device is accessible, wherein the non-network nonfee-based radio communication uses no infrastructure of a communications network;
   (b) when the second wireless device is accessible, transmitting a voice communication directly from the first wireless device to the second wireless device through a non-network communication transport mechanism using a nonfee-based wireless spectrum at a frequency in a first frequency band, the non-network communication transport mechanism uses no infrastructure of a communications network; and
   (c) if the voice communication is not received by the second wireless device, transmitting the voice communication from the first wireless device to the second wireless device using a fee-based communications network at a frequency in a second frequency band, the second frequency band being different than the first frequency band seas in order to leave resources of the fee-based communications network available, wherein the non-network non fee-based spectrum is used to transmit the voice communication directly to the recipient device via a proximity communication transport mechanism comprising an ultra high frequency proximity communication transport mechanism, wherein the fee-based wireless network is used for a first contact stored in a contact directory in the memory, and the non-network nonfee-based spectrum is used for a second contact in the contact directory.

7. The method of claim 6, wherein step (b) comprises transmitting the voice communication directly to the second wireless device.

8. The method of claim 6, wherein step (b) comprises transmitting the voice communication to the second wireless device using a wireless communication channel.

9. The method of claim 6, wherein step (a) comprises attempting to establish communications using a wireless communication protocol.

10. The method of claim 6, wherein step (a) comprises ascertaining whether the second wireless device is within the communication range of a proximity communication transport mechanism.

11. The method of claim 6, wherein step (b) comprises transmitting, or attempting to transmit, a voice communication from the first wireless device directly without utilizing infrastructure of a communication network to a plurality of wireless devices simultaneously using a non-network communication transport mechanism that utilizes a nonfee-based spectrum, wherein the non-network nonfee-based radio communication uses no infrastructure of a communications network.

12. An apparatus that operates in a wireless environment, the apparatus comprising:
   means for attempting to establish a direct communication between a first wireless device and a second wireless device utilizing a non-network communication transport mechanism, attempting to establish the direct communication includes conveying a packet of data directly from the first device to the second device to determine if the second wireless device is accessible, the non-network communication transport mechanism uses no infrastructure of a communications network;
   means for transmitting a voice communication from the first wireless device directly to the second wireless device using the nonfee-based non-network communication transport mechanism at a frequency in a first frequency band when the second wireless device is accessible;
   means for prompting a sender device that delivers the voice communication to elect to proceed with communication of the voice communication over a fee-based communication network when the second device is not accessible; and
   means for transmitting the voice communication from the first wireless device to the second wireless device using a fee-based communications network at a frequency in a second frequency band when the sender elects to proceed with the communication, the second frequency band being different that the first frequency band so as to leave resources of the fee-based communications network available for other uses, wherein the apparatus operates in the non-network non fee-based spectrum to transmit the voice communication directly to the recipient device via a proximity communication transport mechanism comprising an ultra high frequency proximity communication transport mechanism, wherein the apparatus is configurable to selectively operate in the fee-based wireless network for a first contact stored in a contact directory in the memory, and in the non-network nonfee-based spectrum for a second contact in the contact directory.

13. The apparatus of claim 1, when the non-network communication transport mechanism is BLUETOOTH, the memory further retains a BLUETOOTH signature identifier of a wireless handheld device of the potential recipient of the voice communication.

14. The apparatus of claim 1, further comprising a display that renders an icon to indicate a mode of communication, which is one of fee-based network mode, or a non-network nonfee-based mode, or an automatic selection mode, wherein the icon is associated with a contact name in a contact directory retained in the memory.

15. The apparatus of claim 14, when automatic selection mode is active, the display renders a first icon that alerts a user is communicating over the fee-based network mode and a second icon that alerts the user is communicating over the nonfee-based non-network mode.

16. The apparatus of claim 14, wherein the memory stores data that identifies a current mode of communication.

17. The apparatus of claim 1, when the attempt is unsuccessful, the sender device is notified the voice communication cannot be transmitted using the non-network nonfee-based spectrum.

* * * * *